US008465716B2

(12) United States Patent
Le Floch et al.

(10) Patent No.: US 8,465,716 B2
(45) Date of Patent: Jun. 18, 2013

(54) METHOD OF SYNTHESIZING PHOSPHIDE MATERIALS

(75) Inventors: Pascal Le Floch, Orsay (FR); Nicolas Mezailles, Saint Maurice Montcouronne (FR); Xavier Le Goff, Bretigny sur Orge (FR); Benoit Dubertret, Paris (FR)

(73) Assignee: Ecole Polytechnique, Cedex (FR)

( * ) Notice: Subject to any disclaimer, the term of this patent is extended or adjusted under 35 U.S.C. 154(b) by 383 days.

(21) Appl. No.: 12/602,966

(22) PCT Filed: Jun. 2, 2008

(86) PCT No.: PCT/EP2008/056790
§ 371 (c)(1),
(2), (4) Date: May 28, 2010

(87) PCT Pub. No.: WO2008/148738
PCT Pub. Date: Dec. 11, 2008

(65) Prior Publication Data
US 2010/0256407 A1     Oct. 7, 2010

(30) Foreign Application Priority Data
Jun. 5, 2007   (FR) ..................................... 07 55455

(51) Int. Cl.
*C01B 25/00*   (2006.01)
*C07F 5/00*   (2006.01)

(52) U.S. Cl.
USPC ............... 423/305; 423/306; 534/11; 534/15; 556/1; 977/818; 977/821

(58) Field of Classification Search
USPC ... 423/305, 306; 556/1; 534/11, 15; 977/818, 977/821
See application file for complete search history.

(56) References Cited

U.S. PATENT DOCUMENTS

| 4,185,081 A | 1/1980 | Fauth et al. |
| 2008/0258159 A1 * | 10/2008 | Jun et al. .......................... 257/94 |

FOREIGN PATENT DOCUMENTS

EP         0028315         5/1981

OTHER PUBLICATIONS

See Attachment A.
See Attachmen t A.

* cited by examiner

*Primary Examiner* — Porfirio Nazario Gonzalez
(74) *Attorney, Agent, or Firm* — LaRiviere, Grubman & Payne, LLP

(57) ABSTRACT

The subject of the invention is a method of synthesizing a compound $M_xP_y$, where M is an element belonging to one of columns II to XV of the Periodic Table of the Elements or to the family of lanthanides or to the family of actinides, characterized in that it includes the reaction of x moles of compound comprising the element M in its oxidation state 0 with y/4n moles of compound $(P_4)_n$.

The method of the invention may be carried out at a temperature much lower than those necessary in the methods of the prior art. It also allows low-temperature formation of nanoparticles and stoichiometric reaction control.

The applications of this method are numerous: magnetic ferro-magnets for MnP and FeP; hydrodesulfurization catalysts for $Ni_2P$; luminescent nanoparticles for biological applications; microelectronics and optoelectronics for InP; and electronics for GaP. The latter two phosphides are also used in the photovoltaic energy field.

8 Claims, No Drawings

METHOD OF SYNTHESIZING PHOSPHIDE MATERIALS

PRIORITY CLAIM

This application claims priority to PCT Patent Application Number PCT/EP2008/056790, entitled Method of Synthesizing Phosphide Materials, filed Jun. 2, 2008.

FIELD OF THE INVENTION

The invention relates to a novel method of synthesizing $M_xP_y$ compounds starting from pure phosphorus. The compound M may be a metal or any other element belonging to one of columns II to XV of the Periodic Table of the Elements, or even any other element belonging to the family of lanthanides or actinides.

BACKGROUND OF THE INVENTION

Such materials are of interest in very varied fields of applications, which are all those of known metal phosphides. Notably, the following may be mentioned: magnetic ferro-magnet applications for MnP and FeP; hydrodesulfurization catalyst applications for $Ni_2P$; luminescent materials compatible with biological media; microelectronics and optoelectronics for InP; and electronics for GaP. The latter two phosphides are also used in the photovoltaic energy field.

Various methods of synthesis have been proposed hitherto for synthesizing metal phosphides, including FeP, MnP, $Ni_2P$, $PtP_2$, InP and GaP, using synthesis intermediates and generally proposing a double thermolysis of a metal precursor and a phosphorus atom donor.

Thus, the synthesis of $Ni_2P$ may be mentioned, which comprises the thermal decomposition of $Ni(acac)_2$ at 210° C. and then the reaction with a $P(n\text{-octyl})_3$ phosphine compound at 330° C. This temperature of 330° C. is necessary for the decomposition of $P(octyl)_3$ which serves as a "phosphorus atom donor by breaking phosphorus-carbon bonds" as described in the publication "Generalized Synthesis of Metal Phosphide Nanorods via Thermal Decomposition of Continuously Delivered Metal-Phopshine Complexes Using a Syringe Pump" by Jongman Park, Bonil Koo, Ki Youl Yoon, Yosun Hwang, Misun Kang, Je-Geun and Taeghwan Hyeon, J. Amer. Chem. Soc. 127, 8433-8440 (2005). No control of the stoichiometry is therefore possible ($P(n\text{-octyl})_3$ is used as solvent for the reaction). It is therefore possible to obtain only the $M_xP_y$ phase stable at this temperature, namely $Ni_2P$ in this case.

In the case of Pt (which is in the same column as Ni), this synthesis results in $PtP_2$, and therefore an inverse stoichiometry. Thus, it is not possible with this type of method to obtain a compound of different stoichiometry.

FeP and MnP syntheses follow a similar principle. The method is limited by the temperature of decomposition of $P(n\text{-octyl})_3$, which is above 330° C.

As regards the synthesis of InP, it is known to carry out the thermal decomposition of various indium precursors of the CpIn (Cp=cyclopentadienyl), Cp*In (where Cp*=pentamethylcyclopentadienyl) or $In(C(CH_3)_3)_3$ type into In(0) nanoparticles followed by a reaction with $P(SiMe_3)_3$, which precursor is hydrolyzed in situ to $PH_3$, as described in the publication "Growth of InP Nanostructures via Reaction of Indium Droplets with Phosphide Ions: Synthesis of InP Quantum Rods and InP—$TiO_2$ Composites" by Jovan M. Nedeljkovic, Olga I. Micic, S. Philip Ahrenkiel, Alex Miedaner and Arthur J. Nozik, J. Amer. Chem. Soc. 126, 2632-2639 (2004). The compound $P(SiMe_3)_3$ is not only very expensive, as its synthesis is tricky and extremely dangerous, but it also hydrolyzes very easily in air to $PH_3$, which is an extremely toxic substance (fatal in a very low concentration in air: CL50 [ppm/1 h]=20).

SUMMARY OF THE INVENTION

In this context, the present invention provides a method of synthesis employing a stoichiometric reaction giving an excellent reaction yield without loss of initial compounds, contrary to the methods of synthesis in the prior art. The method of the present invention thus makes it possible to obtain a group of $M_xP_y$ stoichiometries, corresponding to the phases that are thermodynamically stable at the reaction temperature and in particular in the 10° C.-100° C. range.

More precisely, the subject of the present invention is a method of synthesizing a compound $M_xP_y$, where M is an element belonging to one of columns II to XV of the Periodic Table of the Elements or to the family of lanthanides or to the family of actinides, characterized in that it includes the reaction of x moles of compound comprising the element M in its oxidation state 0 with y/4n moles of compound $(P_4)_n$.

According to one embodiment of the invention, the reaction of x moles of compound comprising the element M in its oxidation state 0 with y/4n moles of compound $(P_4)_n$ is carried out in the presence of a weakly coordinating solvent in order to allow $M_xP_y$ nanoparticles to form.

According to one embodiment of the invention, the compound $(P_4)_n$ is white phosphorus $P_4$.

Advantageously, the compound $(P_4)_n$ is dissolved in toluene in order to carry out the synthesis according to the invention.

According to one embodiment of the invention, the element M is Ni, n being equal to 1, x being equal to 2 and y being equal to 1.

According to one embodiment of the invention, the Ni-containing compound is $Ni(C_8H_{12})_2$ in which Ni is in its oxidation state 0.

According to one embodiment of the invention, the reaction is furthermore carried out in the presence of oleylamine allowing $Ni_2P$ nanoparticles to be formed.

According to one embodiment of the invention, where the element M is In, the In-containing compound is $(C_5H_5)In$, but it may also be $(C_5(CH_3)_5)In$.

DETAILED DESCRIPTION

The invention will be better understood and other advantages will become apparent on reading the following description, which is given by way of non-limiting example.

In the method of synthesis according to the invention the advantage of using white phosphorus $P_4$, or even red phosphorus $(P_4)_n$, lies also (in addition to the advantage of a stoichiometric reaction with a high yield) in the fact that it is possible to carry out what is called a "gentle" reaction, i.e. at low temperature and therefore with a large energy saving. This is because phosphorus $P_4$ possesses an arrangement of four low-energy bonds in a tetrahedron, which are therefore easily capable of being broken so as to create bonds with other compounds. The present invention therefore takes advantage of the weakness of P—P bonds in the reactant $P_4$, allowing reaction temperatures that are much lower than those observed in the syntheses already reported (around 300° C. to decompose $P(n\text{-octyl})_3$ for example).

Likewise, according to the method of the invention, it becomes possible to form crystalline nanoparticles at low temperature.

The invention provides a very simple method of synthesizing metal phosphides, including $Ni_2P$, InP, GaP, FeP and MnP, using the base product of phosphorus chemistry, namely white phosphorus $P_4$. This method therefore differs substantially from the various methods for obtaining the above species. Furthermore, this method is general—it depends only on the judicious choice of the metal precursor. Thus, the low-temperature thermal decomposition of said precursor, in the presence of $P_4$ and solvent/stabilizing ligand, makes it possible to obtain metal phosphide nanoparticles.

The reaction of a metal precursor (source of M), dissolved in a suitable solvent, with a chosen $P_4$ stoichiometry, the $P_4$ itself being dissolved in toluene, at room temperature or any other temperature between 10° C. and 300° C., results in the almost quantitative formation and in the precipitation of an amorphous $M_xP_y$ solid (the stoichiometry of which corresponds to the phase stable at this temperature).

Example of a Method According to the Invention for Synthesizing the Compound $Ni_2P$ The compound $Ni(COD)_2$ (0.5 mmol) was dissolved in an inert atmosphere in toluene and the solution was stirred. More precisely, the $Ni(COD)_2$ was bis(1,5-cyclooctadiene)Ni, the structure of which is as follows:

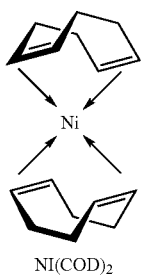

NI(COD)$_2$

A solution of $P_4$ (0.06 mmol) dissolved in toluene was then added drop by drop, resulting in the instantaneous formation of an amorphous black solid comprising $Ni_2P$. This was isolated by simple filtration, washed and dried. X-ray analysis on the powder revealed the amorphous character of the material. Annealing the material led to the formation of crystalline $Ni_2P$, as attested by X-ray powder diffraction.

To obtain $Ni_2P$ nanoparticles, a particular, weakly coordinating, cosolvent was used, this notably may be oleylamine, having the following chemical formula: $CH_3(CH_2)_7CH=CH(CH_2)_8NH_2$. Synthesis of the nanoparticles was carried out as follows:

The $Ni(COD)_2$ compound (0.5 mmol) was dissolved in a weakly coordinating solvent (oleylamine for example, at 5 mmol) and heated at 100° C. for two hours. The dissolved compound $P_4$ (0.06 mmol) was then added and the solution heated at 100° C. for one hour. The $Ni_2P$ nanoparticles were then precipitated using a polar solvent, washed and redispersed in a nonpolar solvent. Typically, the polar solvent may be acetone and the nonpolar solvent may be hexane.

Thus, in the example presented relating to nickel, by judiciously choosing the precursor it is possible to synthesize nickel nanoparticles in the oxidation state 0: Ni(0) at low temperature (100° C.). For comparison, it has been reported that $Ni(acac)_2$ (where acac=acetylacetonate) decomposes at temperatures above 210° C. in the presence of a coordinating solvent, to form Ni(0) nanoparticles according to the prior art.

Example of a Method According to the Invention for Synthesizing the Compound InP The compound $(C_5H_5)$In was dissolved in a solvent (toluene for example) at room temperature and the solution was stirred. The compound $(C_5H_5)$In may easily be obtained from InCl and $LiC_5H_5$ dissolved in diethyl ether.

The compound $(C_5(CH_3)_5)$In may just as well be used.

To obtain InP nanoparticles, a particular, weakly coordinating, cosolvent was used, which notably may be oleylamine of the following chemical formula: $CH_3(CH_2)_7CH=CH(CH_2)_8NH_2$. The synthesis of nanoparticles was carried out as follows:

The compound $(C_5H_5)$In (0.5 mmol) was dissolved in a weakly coordinating solvent (for example oleylamine, 5 mmol) and heated at 70° C. for one hour. The dissolved compound $P_4$ (0.5 mmol) was then added and the solution heated at 100° C. for one hour. The InP nanoparticles were then precipitated using a polar solvent, washed and redispersed in a nonpolar solvent. Typically, the polar solvent may be acetone and the nonpolar solvent may be hexane.

The invention claimed is:

1. A method of synthesizing a compound $M_xP_y$ where M is an element belonging to one of columns II to XV of the Periodic Table of the Elements or to the family of lanthanides or to the family of actinides, and x and y are whole number variables representing a number of moles, and n is a whole number variable, comprising:
   a. causing the chemical reaction of x moles of compound comprising the element M in its oxidation state 0 with y/4n moles of compound $(P_4)_n$; and
   b. in which the chemical reaction is carried out in the presence of a weakly coordinating solvent to form $M_xP_y$ nanoparticles.

2. The method as claimed in claim 1, in which the compound $(P_4)_n$ is white phosphorus $P_4$.

3. The method of synthesis as claimed in claim 2, in which the element M is Ni, x being equal to 2 and y being equal to 1.

4. The method of synthesis as claimed in claim 3, in which the compound comprising Ni is $Ni(C_8H_{12})_2$ in which Ni is in its oxidation state 0.

5. The method of synthesis as claimed in claim 1, wherein the reaction is carried out in the presence of toluene.

6. The method of synthesis as claimed in claim 1, in which the reaction is furthermore carried out in the presence of oleylamine allowing $Ni_2P$ nanoparticles to be formed.

7. The method of synthesis as claimed in claim 1, in which, when M is In, x is equal to 1 and y is equal to 1, and the In-containing compound is $(C_5H_5)$In.

8. The method of synthesis as claimed in claim 1, in which, when the element M is In, the In-containing compound is $(C_5(CH_3)_5)$In.

* * * * *